C. PREJEAN.
NUT LOCK.
APPLICATION FILED MAY 20, 1912.
1,083,463.
Patented Jan. 6, 1914.
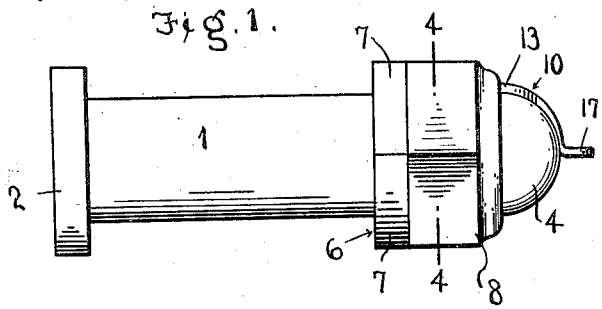
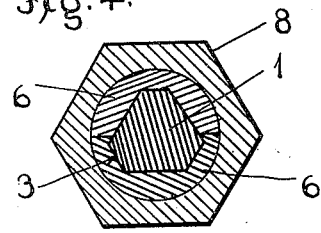
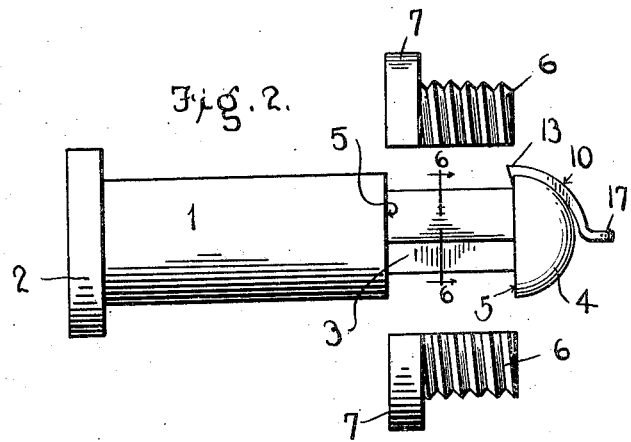
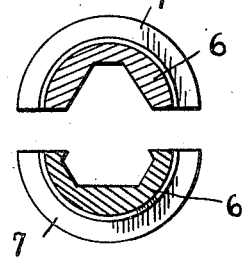
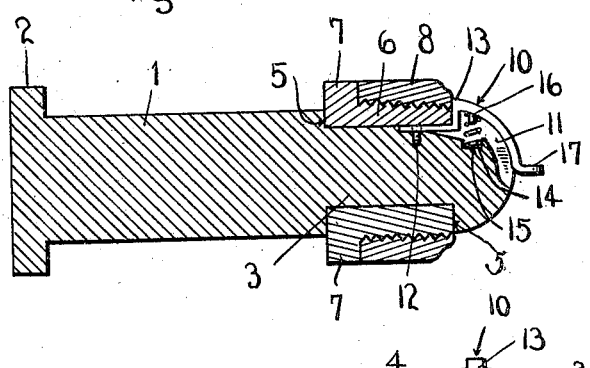
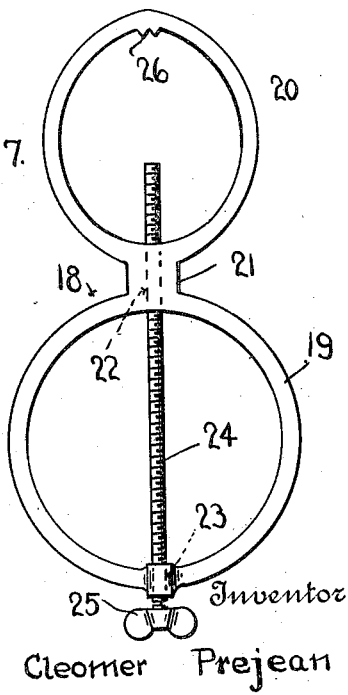
Witnesses
L. B. James
C. E. Hunt
Inventor
Cleomer Prejean
by H. B. Willson &co
Attorneys
COLUMBIA PLANOGRAPH CO., WASHINGTON, D. C.

UNITED STATES PATENT OFFICE.

CLEOMER PREJEAN, OF VERMILION PARISH, LOUISIANA, ASSIGNOR OF TWO-THIRDS TO ANDREW BOYER, HAZARD BROUSSARD, AND LOUIS LAROCHE.

NUT-LOCK.

1,083,463.   Specification of Letters Patent.   Patented Jan. 6, 1914.

Application filed May 20, 1912. Serial No. 698,661.

*To all whom it may concern:*

Be it known that I, CLEOMER PREJEAN, a citizen of the United States, residing in the parish of Vermilion and State of Louisiana, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a nut lock having an improved construction and arrangement of nut receiving members adapted to be held in operative engagement with the end of a bolt by the nut when screwed thereon and which in turn form means for engaging the object to be fastened by the bolt whereby all strain is removed from the threads in the nut and on said members.

Another object is to provide an improved construction and arrangement of nut locking mechanism whereby the nut will be prevented from unscrewing from said nut receiving members.

With these and other objects in view, the invention consists of certain novel features of construction, and the combination and arrangement of parts as will be more fully described and claimed.

In the accompanying drawings, Figure 1 is a side view of a bolt and nut having a locking mechanism constructed in accordance with my invention; Fig. 2 is a similar view showing the nut removed and parts of the locking mechanism separated and disengaged from the bolt; Fig. 3 is a central longitudinal sectional view through the bolt and nut with the parts arranged as in Fig. 1; Fig. 4 is a cross sectional view on the line 4—4 of Fig. 1; Fig. 5 is a similar view of the nut receiving members removed from the bolt; Fig. 6 is a sectional view of the bolt with the nut and nut receiving members removed, taken on the line 6—6 of Fig. 2; Fig. 7 is a plan view of the wrench which is preferably employed for holding the nut locking members to facilitate the removal of the nut.

Referring more particularly to the drawings, 1 denotes the bolt to which my improved locking mechanism is applied, said bolt having on one end any suitable form of head 2 and having its opposite end reduced to form a hexagonal portion 3 at the end of which is formed an enlargement or head 4 which is of less diameter than the bolt. The hexagonal reduced portion of the bolt preferably comprises three long sides and three short sides, said long and short sides being arranged alternately as shown. By thus constructing the bolt it will be seen that the end of the larger inner portion thereof and the inner side of the enlargement or head 4 form shoulders 5, the purpose of which will be hereinafter described.

Engaged with the hexagonal reduced portion of the bolt are nut receiving members 6, said members having their outer surfaces threaded and slightly tapered from their inner toward their outer ends as shown. The inner surfaces of the members 6 are recessed as shown to correspond with the hexagonal surface of the reduced portion of the bolt with which said members are engaged and on the inner ends of said members are formed annular radially projecting semicircular flanges 7, which when the members are brought together into engagement with the reduced portion of the bolt, form an annular projection which is adapted to engage the object to which the bolt is applied.

When the members 6 are engaged with the reduced portion of the bolt, said members will be disposed between the shoulders 5 formed by the end of the larger portion of the bolt and by the inner surface of the head 4, said shoulders thus firmly holding the members 6 against longitudinal movement.

In order to lock the nut 8 against unscrewing from the nut receiving members 6, I provide a suitable locking mechanism comprising a pawl 10 which is arranged in a notch or recess 11 in one side of the outer portion of the reduced end 3 and head 4 of the bolt 1 and which has its inner end loosely secured in the inner end of said notch by a screw or other suitable fastening device 12. On the outer side of the pawl 10 at a point adjacent to the outer end of the nut when the latter is screwed up onto the members 6 is a beveled tooth 13 which when the nut is screwed up into position is adapted to engage the outer end of the same and thereby prevent casual unscrewing of the nut. The pawl is normally projected to engage the tooth 13 with the end of the nut and is yieldingly held in a projected position by a coiled spring 14 having its inner end engaged with a socket 15 in the outer portion of the notch 11 and its outer end engaged with the inner side of the pawl and with a guide stud 16 formed on said inner side of the pawl as shown. The pawl is retracted or drawn back into the notch or recess 11 to permit the nut to be screwed on or off the bolt by means of a handle or thumb piece 17 arranged on the outer end of the pawl, said end being curved inwardly around the outer end of the enlargement 4 in the reduced end of the bolt as shown. When the members 6 are thus held in position between the shoulders 5 by the nut 8, the flanges 7 on the inner ends of said members will engage the object to which the bolt is applied and will securely bind the parts of the object together. By this arrangement it will be seen that the bolt will effectually serve the purpose for which it is intended and that all the strain will be removed from the threads on the nut or on the outer surface of the members, this strain being applied to the ends of the members and to the shoulder 5 on the inner end of the head or enlargement 4 of the bolt as will be readily understood. The size of the reduced portion of the bolt may be increased to compensate for the wearing of the parts or to project the members to a greater or less extent to increase the pressure of the members against the nut when screwed thereon, by inserting thin plates not shown between the flat sides of the reduced portion of the bolt and the spring or adjacent flat surface of the recessed inner sides of the members 6.

In order to hold the nut receiving members while the nut is being removed and to thus facilitate the removal of the nut, I preferably provide a wrench 18 comprising a handle member or frame 19 and a work engaging frame 20 which is integrally connected with the handle frame 19 by a reduced neck 21 in which is formed a longitudinally disposed threaded passage 22. In the outer end of the frame 19 opposite to the passage 22 is formed a guide passage 23 and slidably mounted in said passage 23 and having a threaded engagement with the passage 21 is an operating screw 24 having on its outer end an operating head 25 and having its inner end projecting into the work engaging frame of the wrench as shown. The work engaging frame of the wrench is preferably of elliptical shape and is of sufficient size to be readily engaged with the flanged inner ends of the members 6, said work engaging frame having in one end opposite to the end of the screw 24, teeth 26 which are engaged with the flange 7 of one of the members 6, while the inner end of the screw 24 is screwed into engagement with the flange of the fastening member whereby when said screw 24 is screwed inwardly, the inner ends of the members will be compressed and held together, thus relieving the pressure of the threaded outer surface of the members on the threaded inner surface of the nut and permitting the latter to be readily unscrewed and removed from said members, whereupon the latter may be disengaged from the recessed portion of the bolt and the latter disengaged from the object to which it is applied.

My improved bolt and nut lock is designed particularly for fastening fish plate or railway rails, said bolt and nut locking mechanism, however, may be employed in any other capacity where a bolt of this character may be used.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. A nut lock comprising a bolt having therein a reduced portion forming inner and outer shoulders, exteriorly threaded nut receiving members engaged with said reduced portion of the bolt between said shoulders and a nut adapted to be screwed onto said members whereby the latter are held in engagement with the reduced portion of the bolt and whereby the nut is separated or prevented from coming into engagement with the object to which the bolt is applied by the flanges on said members.

2. A nut lock comprising a bolt having thereon a reduced portion forming inner and outer shoulders, exteriorly threaded nut receiving members engaged with said reduced portion of the bolt between said shoulders, radially projecting flanges on the inner ends of said members, a nut adapted to be screwed onto the threaded portion of said members whereby the latter are held in engagement with the reduced portion of the bolt and a nut locking mechanism adapted to hold said nut in operative engagement with said members.

3. A nut lock comprising a bolt having therein a reduced flat sided portion forming inner and outer shoulders, exteriorly threaded nut receiving members adapted to be engaged with said reduced portion of the bolt between said shoulders, flanges on the inner ends of said members, a nut adapted to be screwed onto said members whereby they are held in position on the bolt, and a spring projected nut locking pawl carried by the bolt whereby the nut is held in operative engagement with said members.

4. A nut lock comprising a bolt having therein a reduced portion provided with a plurality of flat sides and forming inner and outer shoulders, exteriorly threaded segmental nut receiving members having in their inner sides flat sided recesses adapted to fit the flat sides of the recessed portion of the bolt, radially projecting segmental flanges on the inner ends of said members to engage the object to which the nut is applied, a nut adapted to be screwed into engagement with said members whereby they are held in position on the bolt, a pawl loosely secured to the outer end of the bolt, a tooth arranged on said pawl to engage the nut whereby the latter is prevented from unscrewing from said members, a spring to project said pawl and to yieldingly hold the same in position for locking said nut, and a thumb piece on the outer end of the pawl whereby the latter may be retracted to permit the unscrewing of the nut.

5. A nut locking bolt having therein a reduced portion forming shoulders, segmental exteriorly threaded nut receiving members adapted to be engaged with the reduced portion of the bolt between said shoulders, a nut adapted to be screwed onto said members whereby the latter are held in operative engagement with the bolt, and a nut locking pawl adapted to engage the nut whereby the latter is held in operative position on said members.

In testimony whereof I have hereunto set my hand in presence of two subscribing witnesses.

CLEOMER PREJEAN.

Witnesses:
F. MEUREX,
CLOPHA BROUSSARD.

---

Copies of this patent may be obtained for five cents each, by addressing the "Commissioner of Patents Washington, D. C."